United States Patent

[11] 3,616,454

[72] Inventors Milton Levy
Long Island City;
Isaac Schenkein, New York, both of N.Y.
[21] Appl. No. 806,931
[22] Filed Mar. 13, 1969
[45] Patented Oct. 26, 1971
[73] Assignee New York University
New York, N.Y.

[54] METHOD OF AND APPARATUS FOR ELECTROPHORETIC SEPARATION IN A GEL COLUMN
6 Claims, 1 Drawing Fig.

[52] U.S. Cl. .................................................. 204/299,
204/180 G
[51] Int. Cl. .................................................. B01k 5/00
[50] Field of Search .................................................. 204/180 G,
299, 180 R, 301

[56] References Cited
UNITED STATES PATENTS
3,287,244 11/1966 Mel .............................. 204/180 R
3,384,564 5/1968 Ornstein et al. ............... 204/180 G
3,506,554 4/1970 Broome ........................ 204/301
3,533,933 10/1970 Stauch........................... 204/180 G OTHER REFERENCES
Science Vol. 130 No. 3377 P. 711 Sept. 18, 1959 204-180G

*Primary Examiner*—F. C. Edmundson
*Attorney*—Karl F. Ross

ABSTRACT: Method of and apparatus for the preparative gel electrophoresis of a specimen wherein the specimen is placed at the upper end of a polyacrylamide gel column of an electrophoresis gel whose lower end terminates at a receptacle containing an elution solution, an electrical potential of a magnitude sufficient to effect migration of components of the specimen to the lower end of said column is applied thereacross, and the solution is periodically drained from the receptacle and fresh elution buffer in corresponding quantities is introduced while the electrophoresis current is cut off. The column is supported on a layer of open-pore high-wet-strength paper.

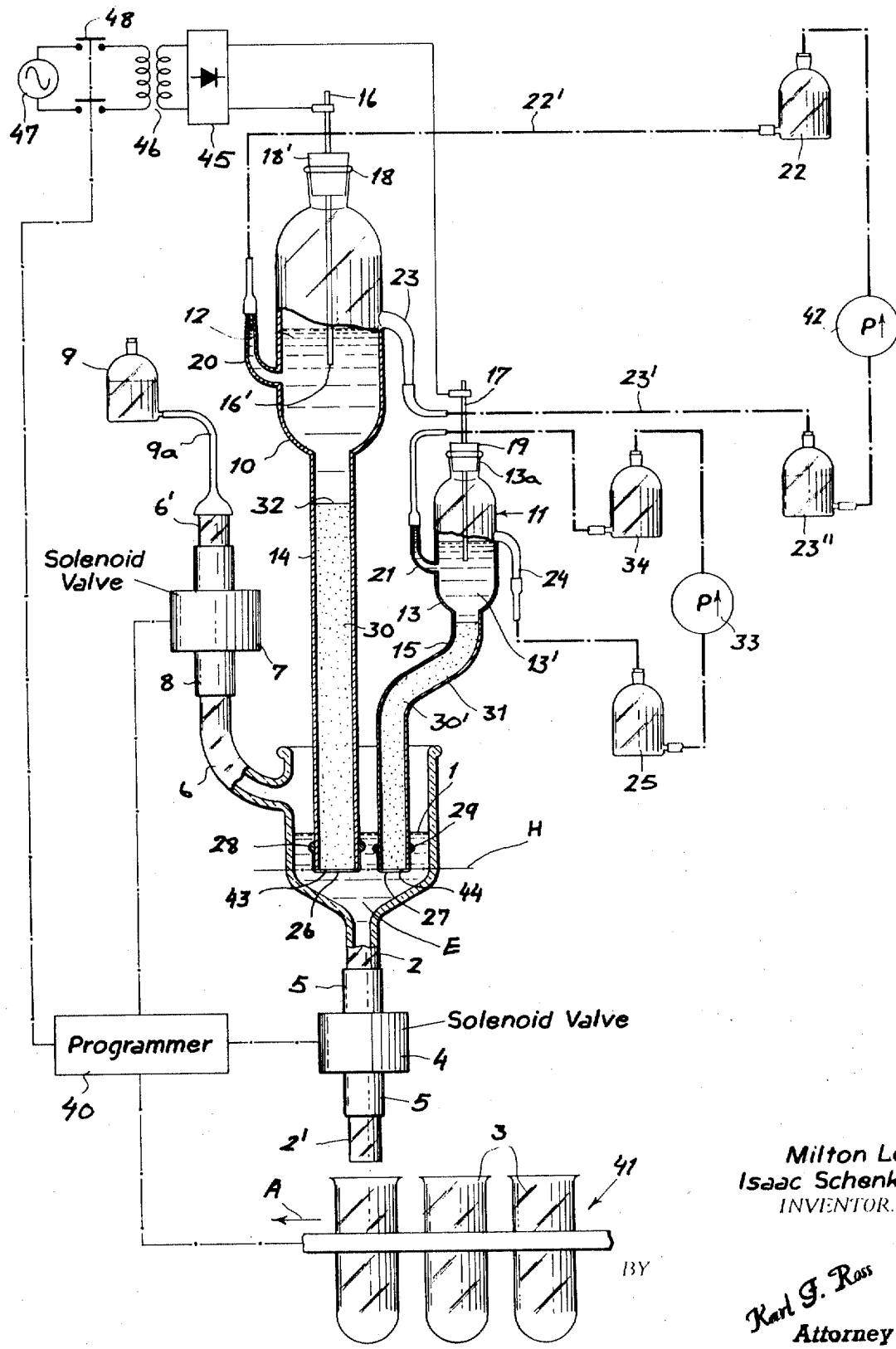

_3,616,454_

METHOD OF AND APPARATUS FOR ELECTROPHORETIC SEPARATION IN A GEL COLUMN

Our present invention relates to a method of and an apparatus for the electrophoretic separation of a specimen in a gel and, more particularly, to gel electrophoresis.

Preparative electrophoresis and the electrophoretic separation of specimens using a gel-column system, advantageously constituted by a polyacrylamide-gel medium, has been proposed by T. Jovin, A. T. Chrambach and M. A. Naughton in Analytical Biochemistry, Vol. 9, No. 3, pgs. 351–369, as a method of improving the resolving power in electrophoresis for analytical and separation purposes. The basic elements of this system include a buffer-solution reservoir terminating at an electrophoresis column containing the polyacrylamide gel whose lower face is spaced slightly from a membrane in a second buffer solution while an elution liquid is passed continuously through this narrow gap with circumferential introduction and central withdrawal. To this end an elution tube passes coaxially through the column and opens flush with the lower face of the gel to withdraw the elution liquid therefrom. The buffer solution above and below the gel constitute electrolytes in which platinum electrodes may be inserted for connection to the terminals of a high-voltage, direct-current power supply to promote electrophoretic migration of the components of the specimen, which is deposited on the upper surface of the gel, downwardly into the elution gap, whence the components are carried off in the continuous flow of elution solution. While this technique provides high resolution in chromatographic analysis of the components of the specimen, it does not always allow for precise separation when recovery of one or more of the constituents of the specimen is desired. Other literature references related to the principles herein involved are Preparative Methods for Disk Electrophoresis, Lewis & Clark, Anal. Biochemistry, Vol. 6, pg. 303 ff., 1963, and Preparative Electrophoresis on Polyacrylamide Gel, D. Racusen & N. Calvanico, Anal. Biochemistry, Vol. 7, pg. 62 ff., 1964.

Systems using a narrow gap between, for example, a rigid porous membrane separating the lower electrolyte buffer from the elution gap, have been characterized by a high-voltage drop and resistance across the membrane at the elution gap and, accordingly, the need for complex arrangements to ensure adequate cooling and little temperature variation. Furthermore, the elution flow must be of a volume sufficient to provide a cooling effect and, accordingly, sample dilutions of a thousand fold are not uncommon.

It is, therefore, the principal object of the present invention to provide an improved system for gel-column electrophoresis which dispenses with the need for complex cooling arrangements, requires only apparatus of lower cost and greater ease of manufacture, and which is able to function with reduced sample dilution.

A further object of this invention is to provide a gel-column electrophoresis apparatus capable of operating without the generation of the considerable heat characterizing earlier systems.

Another object of our invention is to provide an improved method for the electrophoretic separation of specimens enabling the recovery of the constituents thereof.

We have now found, surprisingly, that a substantial improvement and simplification of gel-column electrophoresis can be attained when the aforedescribed narrow gap is eliminated and the porous glass membrane dispensed with and the gel column immersed at its lower end in a receptacle containing an elution solution of a relatively small volume (i.e. a fraction of the volume of the column) and the elution is carried out intermittently by draining this receptacle of predetermined quantities of the elution solution, the electrophoresis current being cut off during the draining step. Thus, according to one aspect of this invention, the apparatus may comprise an upright gel column retained in a tube whose mouth, at the lower end, terminates flush with the gel, extending into an upwardly open receptacle having an outlet permitting the gravity discharge of the elution liquid, and electromagnetic or solenoid valve means at this outlet triggerable by a programmer in the form of timer for periodically discharging the elution liquid collected in the receptacle and containing the constituents of the specimen, originally placed upon the upper end of the gel, which have passed into the liquid within the receptacle. During the collection phase, the electrophoresis current is temporarily terminated and, following the drainage step, fresh elution liquid is introduced into the receptacle to bring its level therein into contact with the low end of the column. Thereafter, current is again applied and electrophoresis continues. In accordance with a particularly advantageous arrangement, the apparatus includes a fraction collector having a plurality of individual vessels (e.g. collection tubes), successively advanced by the programming means into registry with the discharge passage. The elution-liquid supply means may include an intermittently operable pump adapted to meter precise quantities of the elution liquid periodically into the receptacle and triggered in cadence with the solenoid valve. Alternatively, a gravity feed may be provided, with a further solenoid or electromagnetic valve connected to the programmer.

According to another aspect of this invention, electrical connection is made through the elution liquid statically maintained in the receptacle via a further gel column which here acts as a bridge preventing contact between the elution liquid and the buffer electrolyte. The gel bridge may likewise be constituted as an upright tube whose gel column terminates flush with the face of the tube and is provided at its other end with a buffer reservoir into which an electrode extends. The position of the gel bridge is not critical although it has been found that it is advantageous to insert the gel bridge from above into the upwardly open cup-shaped receptacle and dispose its lower end in the same horizontal plane as the mouth of the electrophoretic gel. In this case, the cup may be provided with a side arm communicating with the interior of the receptacle at a location slightly above this plane for delivering the fresh elution solution to the receptacle. The quantity of elution liquid delivered to the receptacle is, of course, equal to that removed therefrom and is preferably the full capacity of the receptacle. Suitable incremental volumes are in the milliliter range, e.g. 2.5 ml.

Still another aspect of this invention resides in the discovery that, using the system herein described, it is possible to eliminate semipermeable and fritted glass membranes and plates in their entirety (without problems of hydrostatic equilibrium) while the lower end of the electrophoresis gel column can be closed with an open-pore, high-wet-strength paper or fabric. Excellent results have been obtained with teabag paper which can be attached to the lower end of the gel column by a high-melting-point wax.

The above and other objects, features and advantages of the present invention will become more readily apparent from the following description, reference being made to the accompanying drawing in which the sole FIGURE is a diagrammatic elevational view of an apparatus embodying the present invention.

In the drawing, we show an apparatus for gel electrophoresis which comprises an upwardly open cup-shaped receptacle 1 having a central outlet 2 over which is placed a rubber sleeve 5 connected with a glass discharge tube 2'. The rubber sleeve is provided with a solenoid valve 4 which is electrically operated by a programmer 40. The glass cup 1 is also formed with a side arm 6 over which has been placed a rubber sleeve 8. A further solenoid valve 7' disposed along this sleeve end, like valve 4, is electrically operated to pinch the rubber tubing and thereby close off passage of liquid into and out of the cup 1. A gravity-feed reservoir 9 of an elution buffer solution is connected by a rubber tube 9a with a glass nipple 6' received in the sleeve 8. Below the outlet 2', a succession of collection vessels 3 (e.g. test tubes) can be advanced in the direction of arrow A as diagrammatically represented in the drawing to successively position the test tubes 3 below the outlet. The test tubes have a capacity approximately equal to the volume of the elution liquid E discharged from the receptacle cup 1 during each cycle. The fraction collector, generally indicated at 41, is stepped by the programmer 40 and may be of any conventional type.

An electrophoretic gel column 30 is received in a vertical glass tube 14 the upper end of which is flared outwardly at 10 to form a buffer reservoir 12 whose mouth 18 can be closed by a plug 18' through which an electrode 16 has been inserted. A sidearm 23 disposed above the bottom end 16' of the electrode forms an overflow return for the electrolyte buffer via a tube 23' and a reservoir 23''. The buffer electrolyte inlet is constituted by a further sidearm 20 communicating with the reservoir 12 below the end 16' of the electrode and, in turn, is connected with the storage vessel 22 by a tube 22'. The buffer electrolyte is circulated through the reservoir 12 by a pump 42. Within the shank 14 of the glass, a column of polyacrylamide gel 30 is provided, the column having an upper end 32 at which the specimen to be subjected to electrophoresis can be disposed by means of a pipet. At its lower end 43, the gel terminates flush with the glass tube and a horizontal plane H while a layer 26 of high-wet-strength paper of open-pore structure is affixed across the lower end with a bead of high-melting-point wax 28 to afford mechanical support to the polyacrylamide gel. The gel column may be formed in the glass tube by the techniques described by JOVIN et al. in their publication cited earlier.

In this structure, the other electrical connection is provided by an electrode 17 inserted through a stopper 19 which closes the mouth 13a of a buffer reservoir 13 in a second gel column 11 whose shank 31 extends downwardly into the upwardly open cup 1. The shank 31 of the glass column 11, is filled with polyacrylamide gel 30' which determinates flush (at 44) with the lower end of the shank 31 and at the horizontal plane H previously described. An open-pore, high-wet-strength paper web 27 is affixed across the mouth of this tube by a bead 29 of high-melting-point wax. Above the gel 30', is maintained the buffer solution 13' in which the electrode 17 is immersed. To permit compact construction, the reservoir 13 is offset horizontally by a S-bend 15 from the shank 31 in the region of the reservoir 10. Via the overflow arm 24, the buffer solution of reservoir 13 passes into a connecting vessel 25 from which it may be displaced by a pump 33 into a receptacle 34 communicating with the inlet arm 21 of the buffer reservoir 13.

The electrophoretic power supply is here represented diagrammatically as including a rectifier 45 supplied with high-voltage alternating current by a transformer 46 which, in turn, is energized by the alternating-current source 47 through a switch 48 controlled by the programmer 40.

In operation, a specimen of the material to be subjected to chromatographic separation is placed upon the upper face 32 of the gel column 30 and, with the elution buffer E previously admitted to the receptacle 1 and buffer solutions in place at 12 and 13', the programmer 40 can be started for automatic separation of the specimen. In the initial phase of each cycle, migration is induced by the high direct current voltage applied across the gel column 30, whereupon a separation of the specimen into its components occurs along the length of the column and the components with those of highest mobility passing initially into the elution liquid E in the lower receptacle. At the commencement of the second phase, namely, elution-solution change, the programmer 40 opens switch 48 and substantially simultaneously opens valve 4 to drain the volume E of the elution liquid completely into the test tube 3 disposed below the outlet tube 2'. In the second step of this phase, valve 4 is closed by the programmer 40 and solenoid valve 7 opened for a period sufficient to admit an identical volume of fresh elution buffer from the receptacle 9 into the cup 1. During this step, the programmer 40 advances the fraction collector 41 to position an empty tube 3 below the outlet 2 while moving the previously filled tube in step along the fraction collector path.

Upon the closure of valve 7, switch 48 is reclosed and electrophoresis continued as previously described to complete the operating cycle.

EXAMPLE

Using an apparatus as described above and illustrated in the drawing, a polyacrylamide gel column is prepared as set forth by JOVIN et al. (see citation above) and supported on a single layer of teabag paper attached to the glass tube by a bead of wax. An albumin specimen (25 mg. in 0.2-ml. buffer) is disposed upon the surface 32 beneath the electrolyte buffer 12 by a pipet through the mouth 18 of the column. Periodic collection cycles were employed at intervals ranging from 3 to 20 minutes, the intervals being terminated by a 30-second drainage and refilling sequence as previously described. 2.5 ml. of elution solution containing eluted components were discharged into the test tubes with an overall dilution of about 100 times. Highly precise separation and recovery of components was possible without difficulties resulting from lack of hydrostatic equilibrium and without temperature control other than the circulation of the buffer solutions above the gel columns. This system was found to be suitable for the purification of biologically active proteins, enzymes and nucleic acids.

The invention described and illustrated is believed to admit of many modifications within the ability of persons skilled in the art, all such modifications being considered within the spirit and scope of the appended claims.

We claim:

1. In an apparatus for the electrophoretic separation of a specimen having an elongated electrophoresis gel column adapted to receive said specimen at one end of said column, means forming a receptacle for an elution solution at the other end of said column, and means for applying an electrophoresis electrical potential across said gel column to induce the migration of components of said specimen from said one end of said column to said receptacle, the improvement which comprises control means for intermittently draining a predetermined quantity of said elution solution from said receptacle, and collector means for receiving the intermittently drained portions of said elution solution.

2. The improvement defined in claim 1 wherein said control means includes mechanism for feeding a corresponding quantity of fresh elution solution into said receptacle substantially in the cadence with the draining of said quantities of said elution solution therefrom, and means for terminating the application of said electrical potential during draining of said receptacle and the feeding of said fresh elution solution thereto.

3. The improvement defined in claim 1 wherein the means for applying said electrophoresis electrical potential across said gel column includes a further gel column having its end contacting said elution solution, a first electrode at said one end of the first-mentioned gel column in electrical connection therewith, a second electrode in electrical connection with said further gel column and a source of high-voltage direct current connected across said electrodes.

4. The improvement defined in claim 1, wherein said receptacle is provided with a downwardly extending discharge passage, said control means further comprising an electromagnetic valve along said passage triggerable to permit the gravity drain of said elution solution from said receptacle.

5. The improvement defined in claim 1, further comprising a fraction collector having a plurality of individual vessels successively alignable with said receptacle for collecting respective quantities of the elution solution drained from said receptacle.

6. The improvement defined in claim 1, further comprising a layer of open-pore high-wet-strength paper spanning the mouth of said gel column at said other end for supporting said gel column.

* * * * *